(12) United States Patent
Kim et al.

(10) Patent No.: US 10,040,031 B2
(45) Date of Patent: Aug. 7, 2018

(54) HIGH-FLUX FORWARD OSMOSIS MEMBRANE ASSEMBLY, AND FORWARD OSMOSIS MODULE CONTAINING SAME

(71) Applicant: TORAY CHEMICAL KOREA INC., Gyeongsangbuk-do (KR)

(72) Inventors: Cheong Hee Kim, Jeollanam-do (KR); Jong Hwa Lee, Gyeonggi-do (KR)

(73) Assignee: Toray Chemical Korea Inc. (KR)

( * ) Notice: Subject to any disclaimer, the term of this patent is extended or adjusted under 35 U.S.C. 154(b) by 121 days.

(21) Appl. No.: 14/915,398

(22) PCT Filed: Aug. 25, 2014

(86) PCT No.: PCT/KR2014/007893
§ 371 (c)(1),
(2) Date: Feb. 29, 2016

(87) PCT Pub. No.: WO2015/030448
PCT Pub. Date: Mar. 5, 2015

(65) Prior Publication Data
US 2016/0220962 A1  Aug. 4, 2016

(30) Foreign Application Priority Data
Aug. 30, 2013 (KR) .................. 10-2013-0103696

(51) Int. Cl.
*B01D 61/12* (2006.01)
*B01D 63/10* (2006.01)
(Continued)

(52) U.S. Cl.
CPC .......... *B01D 63/12* (2013.01); *B01D 61/002* (2013.01); *B01D 63/103* (2013.01); *C02F 1/445* (2013.01);
(Continued)

(58) Field of Classification Search
None
See application file for complete search history.

(56) References Cited

U.S. PATENT DOCUMENTS 3,813,334 A * 5/1974 Bray ................. B01D 63/10
                                                  210/321.83
4,277,344 A * 7/1981 Cadotte ............. B01D 69/125
                                                  210/490
(Continued)

FOREIGN PATENT DOCUMENTS

KR   2001 939 230 000        8/2000
KR   10 2001 009 2518        1/2003
(Continued)

OTHER PUBLICATIONS

Ren et al, "A new commercial thin film composite membrane for forward osmosis", Desalination 343 (2014) 187-193.*

*Primary Examiner* — Krishnan S Menon
(74) *Attorney, Agent, or Firm* — Emerson Thomson Bennett LLC; Daniel A. Thomson

(57) ABSTRACT

The present invention relates to a high-flux forward osmosis membrane assembly and a forward osmosis module using the same, and more specifically, to a forward osmosis membrane assembly capable of improving the flux inside an osmosis membrane and simultaneously promoting uniform flux along a fluid flow route by forming more channels inside the osmosis membrane in order to allow an osmotic action to be smoothly performed even if formed in a spiral wound shape, and minimizing the separation, which could occur, of a different osmosis membrane adhering to each other by minimizing the concentration polarization on the surface of the forward osmosis membrane by increasing the flux on the surface of the osmosis membrane through the promotion of turbulence along the channels and simultaneously forming separate channels inside the osmosis mem- (Continued)

brane, and a forward osmosis module in which the active area of a separation membrane capable of performing a smooth osmotic action and forming an osmotic pressure gradient is maximized by using the same.

8 Claims, 6 Drawing Sheets

(51) Int. Cl.
    *C02F 1/44*     (2006.01)
    *C02F 103/08*     (2006.01)
    *B01D 63/12*     (2006.01)
    *B01D 61/00*     (2006.01)
(52) U.S. Cl.
    CPC ...... *B01D 2313/14* (2013.01); *C02F 2103/08* (2013.01)

(56) References Cited

U.S. PATENT DOCUMENTS

| | | | | |
|---|---|---|---|---|
| 4,792,401 | A | * | 12/1988 | Truex ............... B01D 63/10 210/321.74 |
| 5,275,726 | A | † | 1/1994 | Feimer |
| 2005/0121380 | A1 | * | 6/2005 | De La Cruz ........ B01D 63/10 210/321.83 |
| 2013/0098829 | A1 | * | 4/2013 | Dontula ............. B01D 63/10 210/457 |
| 2014/0183134 | A1 | † | 7/2014 | Herron |

FOREIGN PATENT DOCUMENTS

| KR | 10 2004 007 3923 | 9/2010 |
|---|---|---|
| KR | 10 2013 000 2837 | 2/2014 |

\* cited by examiner
† cited by third party

HIGH-FLUX FORWARD OSMOSIS MEMBRANE ASSEMBLY, AND FORWARD OSMOSIS MODULE CONTAINING SAME

TECHNICAL FIELD

The present invention relates to a high-flux forward osmosis membrane assembly and a forward osmosis module using the same, and more particularly, to a high-flux forward osmosis membrane assembly that is capable of maximizing an osmotic pressure gradient even through the high-flux forward osmosis membrane assembly is formed in a spiral wound shape to improve a flux and also minimize reduction of an active area of a separation membrane, which generates the osmotic pressure gradient.

BACKGROUND ART

When a semi-permeable membrane through which passes water but hardly passes dissolved materials (ion and molecule) is installed between the solution with a high concentration and the solution with a low concentration, a natural phenomenon occurs. Here, the natural phenomenon is called an "osmotic action" or "osmotic phenomenon". M. Traube, German chemist, discovered the osmotic phenomenon in 1867, and Pfeffer measured the osmotic pressure caused by the osmotic phenomenon in 1877.

This osmotic phenomenon may be the core of the desalination technology using seawater, which is one of methods for solving worsen water shortage that is caused by a climate change due to the global warming, an increase of industrial water due to the industrialization, and an increase of water demand due to the population growth.

However, the current seawater desalination process may have a limitation in the economic aspect so far due to high energy-intensive process except for water shortage areas such the Middle East.

A method for converting seawater into fresh water by removing salts contained in the seawater may be classified into an evaporation method and a reverse osmosis method.

In water treatment processes based on the reverse osmosis method, a pressure corresponding to the osmotic pressure induced by the dissolved solutes should be applied to the feed water in order to separate the solutes such as salts (e.g., NaCl) from the water. For example, the concentration of salts dissolved in seawater is 30,000 ppm to 45,000 ppm, and the osmotic pressure induced thereby is approximately 20 atm to 30 atm. As a result, in order to produce fresh water from the feed water, a pressure exceeding 20 atm to 30 atm has to be applied to the feed water. Thus, energy of at least 6 kW/m$^3$ to 10 kW/m$^3$ is generally required to produce 1 m$^3$ of fresh water from seawater.

Although an energy recovery system has been developed recently and used to reduce energy consumption in the reverse osmosis process, even in that case, energy of at least about 3 kW/m$^3$ is required to drive a motor of a high-pressure pump. To solve this problem, a water treatment method using a forward osmosis membrane has recently been presented as a solution.

The forward osmosis method is used for the membrane separation through the phenomenon in which the solution with the low concentration moves to the solution with the high concentration. Since the forward osmosis method utilizes the natural osmosis phenomenon, it is very economical as compared to the reverse osmosis method because it is not necessary to apply a separate pressure. Thus, the development of the forward osmosis membrane is being actively carried out recently. The forward osmosis method that is a contrary concept of the reverse osmosis method may be different from the reverse osmosis method in separation membrane. Thus, it may be difficult to apply the reverse osmosis membrane to the forward osmosis membrane.

In the forward osmosis method, water as a draw solution may be well introduced from feed water through the membrane, whereas a concentration of a draw solute has to be uniformly maintained, and simultaneously, a high osmotic pressure has to be maintained.

For this, it may be very important to design the forward osmosis membrane so that the forward osmosis membrane has to have high water permeability in an osmosis direction, and the solute of the draw solution is not diffused in a reverse osmosis direction. Also, the manufacture of the forward osmosis membrane having relatively low membrane contamination has to be preceded.

Essential conditions of the forward osmosis membrane are as follows.

First, in order to minimize an internal concentration polarization to improve fouling resistance, a support layer within the forward osmosis membrane has to have high porosity, and a pore has to have low tortuosity. Second, in order to increase a flux of water to be penetrated, a thickness of the forward osmosis membrane has to be minimized. Third, in order to minimize water penetration resistance, a material having hydrophilic property may be used. Fourth, in order to maintain the draw solution having the high concentration, the solute does not have to be diffused from the solution having the high concentration to the solution having the low concentration.

Even if the above-described forward osmosis membrane is developed and used, it may be difficult to achieve the object for the separation of the fresh water from the seawater through the maximum osmotic pressure gradient. To realize the forward osmosis method, the above-described forward osmosis membrane has to be essentially provided. In addition, it may be necessary that the seawater smoothly flows into the forward osmosis membrane so that the osmotic pressure gradient with respect to the draw solution flowing outside the forward osmosis membrane is well generated.

In the related art, a channel having one spacer is formed so that the seawater smoothly flows into the forward osmosis membrane. Particularly, FIG. 1 is a perspective view of a forward osmosis membrane assembly according to the related art. Referring to FIG. 1, one spacer 2 is provided between forward osmosis membranes 1 and 3. However, if the one spacer is provided as described above, the smooth introduction of the seawater into the forward osmosis membranes, which is capable of maximally generating the osmotic pressure gradient may be difficult, and thus, it may be difficult to achieve the desired flux.

Also, Korean Patent Application No. 2010-7023340 discloses a spiral wound membrane module for forward osmosis. Here, at least one spacer is simply provided, but limitations thereof are not defined. Also, the at least one spacer is provided to achieve a desired height, volume, and flux, or other variables in a fluid flow route, but their effects are not specifically described.

However, for the sole reason in which the spacer is provided in plurality within the forward osmosis membrane without defining its limitation as described in the foregoing specification, the flux is not necessarily increased through the desired superior osmotic pressure gradient. If the spacer is provided without considering the number of spaces and a thickness of each of the spacers, the spacer may have an influence on an area of the forward osmosis separation membrane, which is capable of generating the osmotic pressure gradient, of the limited forward osmosis module. If the spacer has a thickness exceeding a predetermined thickness, the forward osmosis separation membrane may decrease in area to cause deterioration of the osmotic pressure gradient.

Furthermore, a fluid may flow between the inside and outside of the forward osmosis separation membrane, which have to be fluidically isolated from each other, due to an adhesion defect of the forward osmosis separation membrane. Thus, a specific study on a spacer that is capable of solving the above-described problem and also achieving a maximum flux is urgent.

DISCLOSURE OF THE INVENTION

Technical Problem

To solve the above-described problems, an object of the present invention is to provide a forward osmosis membrane assembly, which is capable of realizing a smooth osmotic action even if formed in a spiral wound shape to achieve an improved flux, and simultaneously, is easily wound when manufactured as a forward osmosis module, and is capable of preventing an osmotic pressure gradient from being dissipated due to separation of the forward osmosis membrane.

Another object of the present invention is to provide a forward osmosis module, which is capable of maximizing an osmotic pressure gradient by using a forward osmosis membrane assembly to achieve an improved flux.

Technical Solution

To solve the above-described first object, the present invention is to provide a forward osmosis membrane assembly including: a first separation membrane; a second separation membrane; and a plurality of spacers for defining channels between the first separation membrane and the second separation membrane, wherein the spacers satisfy a following condition (1):

$$18 \leq \sum_{i=1}^{j} d_i \leq 80, \quad (1)$$

where i represents an individual spacer, j represents the total number j of spacers, and d represents a thickness (milli inch) of the individual spacer.

According to a preferred embodiment of the present invention, at least one of the first separation membrane and the second separation membrane may include a forward osmosis membrane.

According to another preferred embodiment of the present invention, when a 2M NaCl aqueous solution is used as a draw solution, and distilled water is used as feed water, the forward osmosis membrane may have a flux greater than that of 13 gfd and backward diffusion of salts, which is less than that of 0.09 (μs/cm·min).

According to further another preferred embodiment of the present invention, the forward osmosis membrane may include: a support body; a polymer support layer disposed on the support body; and a polyamide-based active layer disposed on the polymer support layer.

According to another preferred embodiment of the present invention, the support body may include a non-woven fabric or woven fabric that is formed of a synthetic fiber selected from the group consisting of polyester, polypropylene, nylon, and polyethylene or a natural fiber including a cellulose-based pulp.

According to further another preferred embodiment of the present invention, the polymer support layer may include at least one selected from the group consisting of a polysulfone-based polymer, a polyamide-based polymer, a polyimide-based polymer, a polyester-based polymer, an olefin-based polymer, a polybenzimidazole polymer, polyvinylidene fluoride and polyacrylonitrile.

According to another preferred embodiment of the present invention, each of the first separation membrane and the second separation membrane may have a thickness of 40 μm to 150 μm.

According to further another preferred embodiment of the present invention, each of the spacers may include at least one of a tricot filtering channel and a mesh sheet.

According to another preferred embodiment of the present invention, each of the spacers further satisfies following conditions (2) to (5):

$$2 \leq a+b \leq 8, \quad (2)$$

where, a≥0, b≥0,

When the tricot filtering channel is provided, $$5 \leq x \leq 20, \quad (3)$$

When the mesh sheet is provided, $$24 \leq y \leq 50, \quad (4)$$

$$40 \leq p+q \leq 80 \quad (5)$$

where the a represents the number of tricot filtering channels, the b represents the number of mesh sheets, the x represents a thickness (milli inch) of the single tricot filtering channel, the y represents a thickness (milli inch) of the single mesh sheet, the p represents the sum of a total thicknesses (milli inch) of the tricot filtering channels, and the q represents a total thickness (milli inch) of the mesh sheets.

According to another preferred embodiment of the present invention, the spacer further satisfies a following condition (6): 60≤p+q≤80

According to further another preferred embodiment of the present invention, the spacer may include at least one tricot filtering channel.

According to another preferred embodiment of the present invention, the spacers may include two tricot filtering channels, each of which has a thickness of 9 milli inches and one mesh sheet having a thickness of 46 milli inches.

According to further another preferred embodiment of the present invention, the mesh sheet may have porosity of 0.3% to 0.6%.

To solve the above-described second object, the present invention is to provide a forward osmosis module including a plurality of forward osmosis membrane assembles, which are wound in a spiral wound shape.

Advantageous Effects

The high-flux forward osmosis membrane may satisfy the conditions according to the present invention to improve the flux in the osmosis membrane and simultaneously promoting the uniform flux along the channels by forming the more channels in the osmosis membrane in order to allow the osmotic action to be smoothly performed even if formed in the spiral wound shape. Also, the turbulence may be promoted along the channels to improve the flux on the surface of the osmosis membrane and minimize the concentration polarization on the surface of the osmosis membrane. Furthermore, the high salt rejection ratio may be achieved.

Second, since the conditions according to the present invention are satisfied, the separation of the different osmosis membranes adhering to each other, which may occur by forming the separate channel in the osmosis membrane may be minimized, and when manufactured as the forward osmosis module, the forward osmosis membrane assembly may be easily wound, and the deterioration of the osmotic pressure gradient due to the abnormal winding may be prevented.

Third, since the forward osmosis membrane assembly having the improved flux satisfying the conditions according to the present invention is used, the osmotic action may be smoothly performed, and the forward osmosis module having the maximized active area may be provided.

MODE FOR CARRYING OUT THE INVENTION

Preferred embodiments of the present invention will now be described in detail with reference to the accompanying drawings.

As described above, the one spacer may be provided to realize the smooth flux of the seawater into the forward osmosis membrane according to the related art. However, if the one spacer is provided, the smooth introduction of the seawater into the forward osmosis membrane, which is capable of maximally generating the osmotic pressure gradient, may be difficult, and thus, it may be difficult to achieve the desired flux.

Also, for the sole reason in which the spacer is provided in plurality within the forward osmosis membrane without defining its limitation, the flux is not necessarily increased through the desired superior osmotic pressure gradient.

Furthermore, since the total thickness of the spacers in consideration of the number of spacers and the thickness of each of the spacers have an influence on the area of the forward osmosis separation membrane, which is capable of generating the osmotic pressure gradient, of the limited forward osmosis module, if the space has a thickness exceeding a predetermined thickness, the deterioration of the osmotic pressure gradient may occur.

Furthermore, the fluid may flow between the inside and outside of the forward osmosis separation membrane, which have to be fluidically isolated from each other, due to the adhesion defect of the forward osmosis separation membrane.

Thus, the forward osmosis membrane assembly according to the present invention may include: a first separation membrane; a second separation membrane; and a plurality of spacers for forming channels between the first separation membrane and the second separation membrane. Thus, the forward osmosis membrane assembly that satisfies the following condition (1):

$$18 \leq \sum_{i=1}^{i} d_i \leq 80,$$

where the i represents an individual spacer, the j represents the total number j of spacers, and the d represents a thickness (milli inch), may be provided to seek the solutions for the above-described problems.

The more channels may be formed in the osmosis membrane so that the osmotic action is smoothly performed, even if formed in a spiral wound shape, to improve a flux in the osmosis membrane, and simultaneously, to minimize separation of different osmosis membranes adhering to each other, which may occur by forming a separate channel in the osmosis membrane and secure easy winding of the forward osmosis membrane assembly when manufactured as the forward osmosis module.

Figure 1:
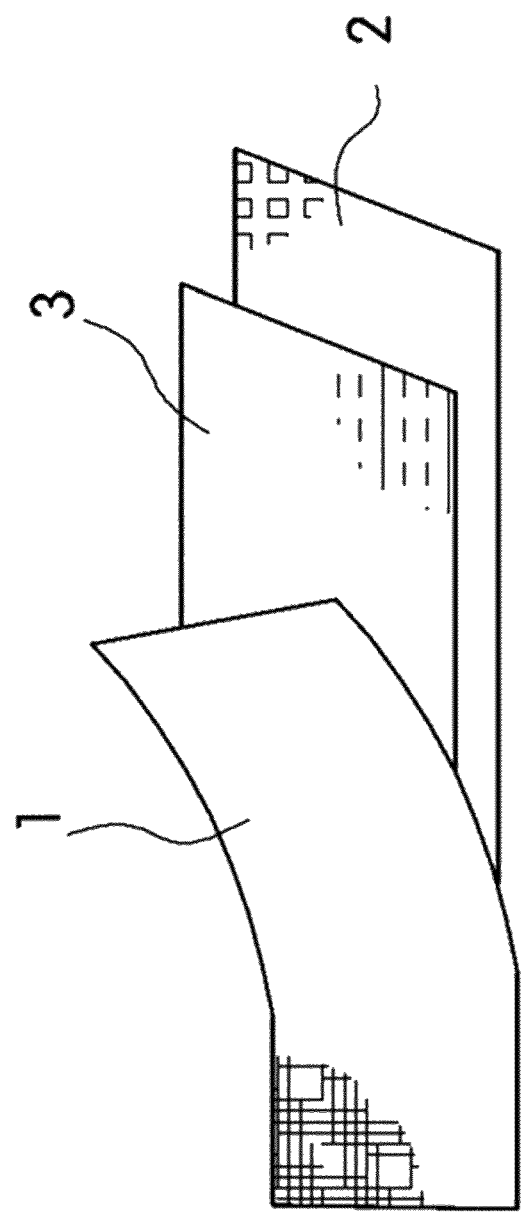
FIG. 1 is a perspective view of a forward osmosis membrane assembly according to a related art.
Figure 2:
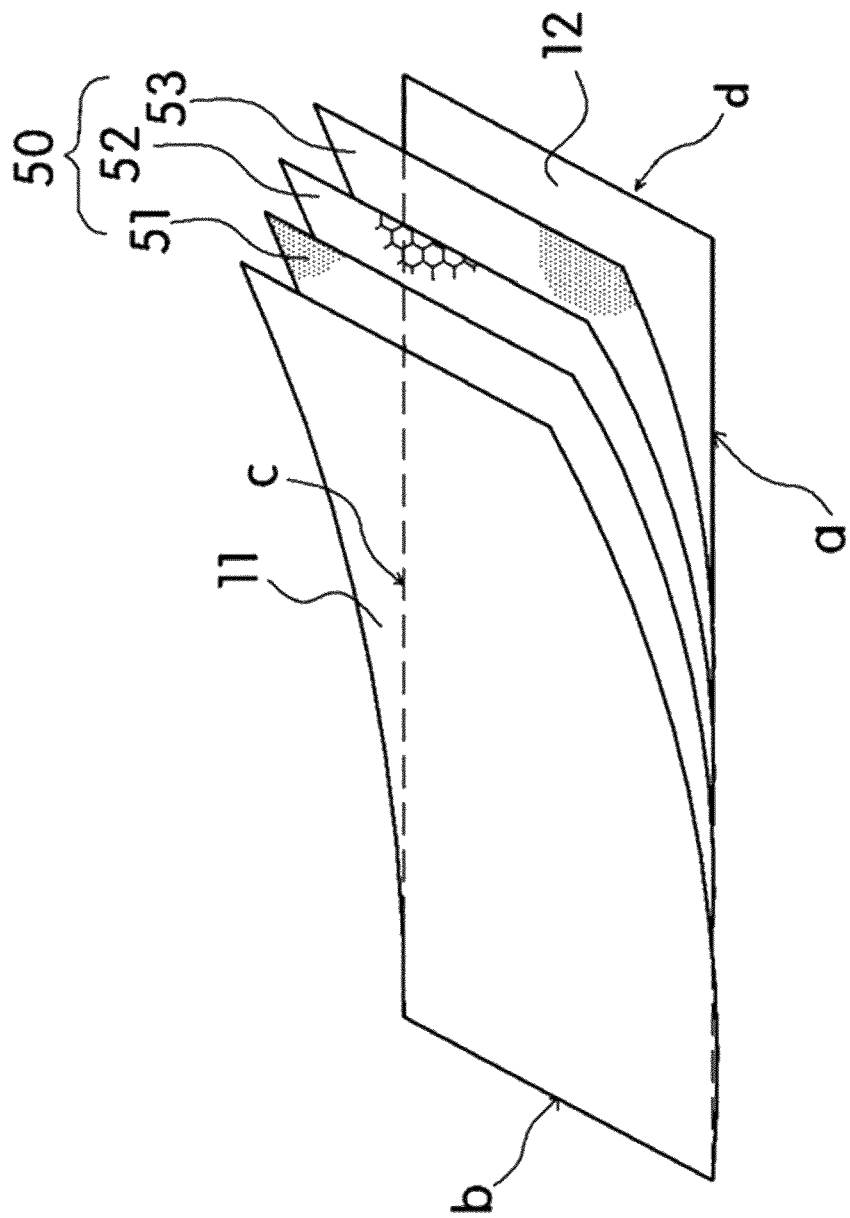
FIG. 2 is a perspective view of a forward osmosis membrane assembly according to a preferred embodiment of the present invention.

FIG. 2 is a perspective view of the forward osmosis membrane assembly according to a preferred embodiment of the present invention. The forward osmosis membrane assembly includes a plurality of spacers 51, 52, and 53 between a first separation membrane 11 and a second separation membrane 12.

The plurality of spacers 51, 52, and 53 and the first separation membrane 11 are successively stacked on the second separation membrane 12, and the first and second separation membranes 11 and 12 adhere to an edge of each of the spacers 51, 52, and 53. Also, an inner space defined by the first separation membrane 11 and the second separation membrane 12, in which the spacers 51, 52, and 53 are disposed, may have an envelope shape so that three surfaces of surfaces defining the inner space except for a surface through which a solution is introduced from a porous water-permeable discharge tube (see reference numeral 20 of FIG. 4) adhere to each other to generate an osmotic pressure between two solutions having concentrations different from each other.

Particularly, in FIG. 2, the inner space may have the envelope shape in which the first separation membrane 11 and the second separation membrane 12 are sealed along edges a, b, and c of the second separation membrane 12 through glue or an adhesive, and a portion d of FIG. 2, which corresponds to the portion through which the solution is introduced from the porous water-permeable discharge tube to the forward osmosis membrane assembly is not seated. The envelope shape as described above may fluidically isolate the solution flowing into the forward osmosis membrane assembly from the solution flowing outside the forward osmosis membrane assembly to generate the osmotic pressure gradient between the two solutions having the concentrations different from each other by using the separation membrane as a boundary.

First, the separation membranes 11 and 12 will be described.

The separation membranes 11 and 12 according to a preferred embodiment of the present invention may be described with reference to Korea Patent Application Nos. 2012-0140804 and 2012-0140801, which are filed by the inventor of the present invention.

One of the first separation membrane 11 and the second separation membrane 12 according to the present invention may be a forward osmosis membrane.

The first separation membrane 11 and the second separation membrane 12 may be equal to or different from each other. At least one of the first and second separation membranes 11 and 12 may be the forward osmosis membrane, or all the first and second separation membranes 11 and 12 may be the forward osmosis membranes.

Preferably, the forward osmosis membrane may be a forward osmosis membrane including: a support body; a polymer support layer disposed on the support body; and a polyamide-based active layer disposed on the polymer support layer.

Figure 3:
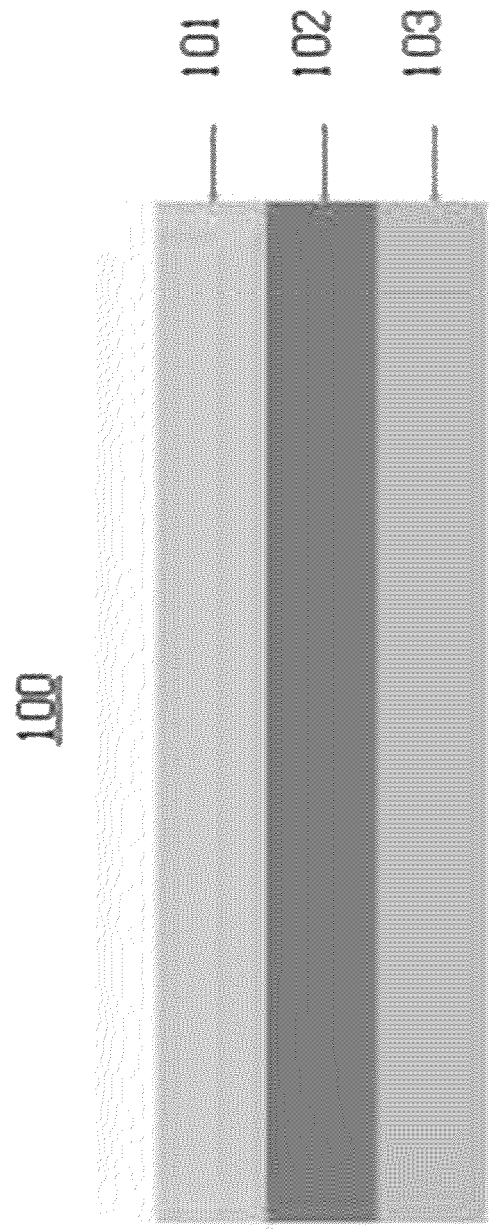
FIG. 3 is a cross-sectional view of a forward osmosis separation membrane according to a preferred embodiment of the present invention.

Particularly, FIG. 3 is a cross-sectional view of a forward osmosis membrane according to a preferred embodiment of the present invention. A forward osmosis membrane 100 may be a composite membrane in which a polymer support layer 102 is disposed on a support body 103, a polyamide-based active layer 101 is disposed on the polymer support layer 102.

First, the support body 103 may support the membrane and give high hydrophilicity to the support body to allow water to smoothly flow. The support body 103 may have a non-woven fabric shape having no longitudinal directivity due to interlacing fibers or a woven fabric shape having longitudinal directivity. Preferably, a synthetic fiber selected from the group consisting of polyester, polypropylene, nylon, and polyethylene or a natural fiber including a cellulose-based pulp may be used as a material for the support body 103. However, the present invention is not limited to the above-described material for the support body 103.

When the support body 103 is provided as the non-woven fabric layer, a physical property of the membrane may be adjusted according to porosity and hydrophilicity of the material. The non-woven fabric layer may have a mean pore size of 1 μm to 600 μm. Preferably, when the non-woven fabric layer has a mean pore size of 5 μm to 300 μm, smooth introduction and water permeability, which are required for the forward osmosis separation membrane, may be improved. However, the present invention is not limited to the above-described material.

The support body 103 may have a thickness of 20 μm to 150 μm. If the support body 103 has a thickness less than that of 20 μm, strength and support of the entire membrane may be insufficient. If the support body 103 has a thickness greater than that of 150 μm, a flux may be reduced.

Next, the polymer support layer 102 disposed on the support body 103 will be described.

The polymer support layer 102 may have a porous structure to secure high flux. Preferably, the polymer support layer 102 may have a weight average molecular weight of 50,000 to 1,000,000 in consideration of mechanical strength. The polymer support layer 102 may be formed of a polysulfone-based polymer, a polyamide-based polymer, a polyimide-based polymer, a polyester-based polymer, an olefin-based polymer, a polybenzimidazole polymer, polyvinylidene fluoride or polyacrylonitrile alone or in combination thereof. For example, the polysulfone-based polymer may be formed of polysulfone, polyether sulfone, or polyallylether sulfone alone or a copolymer or modified material of the polymers, or a mixture thereof. However, the present invention is not limited to the above-described material.

Also, the polyacrylonitrile (PAN) and a synthetic polymer in which a polymer having a hydrophilic functional group is copolymerized may be used. Here, the polymer having the hydrophilic functional group may be a polymer that is compatible with polyacrylonitrile, i.e., a polymer having one functional ground selected from a hydroxyl group, a sulfonic group, a carbonyl group, an acetate group, and an ester group. For example, the synthetic polymer may be a PAN-vinyl acetate copolymer or a PAN-acrylic ester copolymer.

Preferably, the polymer support layer 102 may have a thickness of 30 μm to 250 μm. If the polymer support layer 102 has a thickness less than that of 30 μm, maintenance of the mechanical strength may be insufficient. If the polymer support layer 102 has a thickness greater than that of 250 μm, the flux may be reduced. However, the present invention is not limited to the above-described material.

The polymer support layer 102 may have porosity of 30% to 80% and include a finger-like macro-pore. The macro-pore may represent a large pore having a mean diameter of 50 μm or more.

The polymer support layer 102 may have porosity of 30% to 80%, more preferably, 50% to 80%. As the pore is reduced in tortuosity, water may be smoothly introduced, and a high penetration ratio may be realized. Preferably, the finger-like macro-pore may have a long axis of 1 μm to 200 μm and a short axis of 1 μm to 50 μm.

Next, the polyamide-based active layer 101 disposed on the polymer support layer 102 will be described.

The polyamide-based active layer 101 may have fouling resistant and chemical resistant as proper physical properties of its material. Thus, backward diffusion of salts may be minimized by the relatively dense pores. Preferably, the polyamide-based active layer 101 may have a thickness of 0.1 μm to 1.0 μm. If the polyamide-based active layer 101 has a thickness less than that of 0.1 μm, salt rejection performance may be reduced and thus do not serve as a selective layer. If the polyamide-based active layer 101 has a thickness exceeding 1.0 μm, the selective layer may have a significantly thick thickness to reduce the flux.

Particularly, the polyamide-based active layer 101 may be formed by contacting an organic solution including a polyfunctional acid halide after the polymer layer 102 is immersed in an aqueous solution including polyfunctional amine.

More particularly, the polyfunctional amine may be polyamine that is a material having 2 or 3 amine functions per a monomer and includes primary amine and secondary amine. Here, m-phenylenediamine, p-phenylenediamine, ortho-phenyldiamine, and aromatic primary diamine as a substituent may be used as the polyfunctional amine. For another example, aliphatic primary diamine, cycloaliphatic diamine such as cyclohexene diamine, cycloaliphatic secondary diamine such as piperazine, aromatic secondary amine, or the like may be used as the polyfunctional amine. More preferably, m-phenylenediamine that is an aromatic primary diamine or piperazine that is cycloaliphatic secondary diamine may be used as the polyfunctional amine.

The polyfunctional amine aqueous solution may have a concentration of 0.1 wt % to 20 wt %. Preferably, 0.5 wt % to 8 wt % of a polyamine aqueous solution may be used as the polyfunctional amine aqueous solution. More preferably, an aqueous solution containing 0.1 wt % to 2 wt % of m-phenylenediamine may be used as the polyfunctional amine aqueous solution.

Preferably, the polyfunctional amine aqueous solution may have a pH of 7 to 10. Here, although the pH is adjustable by injecting a basic material, if the polyfunctional amine aqueous solution contains amine salts by which at least one amine ground acts as an acid acceptor, it may be unnecessary to add the basic material.

The amine salts may be a material that reacts with tertiary polyamine. Here, the tertiary polyamine may have n tertiary polyamines and react at a molar ratio of 1:1 or more and 1:n or less when reacting with a strong acid.

The tertiary polyamine salt may form a pore of a polyamide membrane to increase the flux. Also, the tertiary polyamine salt may act as the acid acceptor of an acid generated during an interfacial reaction to promote the interfacial reaction.

Examples of the strong acid may include an aromatic sulfonic acid, an aliphatic sulfonic acid, a cycloaliphatic sulfonic acid, a trifluoro acetic acid, a nitric acid, a hydrochloric acid, a sulfonic acid, and a mixture thereof. The tertiary polyamine to be used may include 1,4-diazabicyclo [2,2,2,] octane (DABCO), 1,8-diazabicyclo [5,4,0] undec-7-ene (DBU), 1,5-diaza-bicyclo [4,3,0] non-5-ene (DBN), 1,4-dimethylpiperazine, 4-[2-(dimethylamino) ethyl] morpholine base, N, N, N', N', -tetramethylethylenediamine, N, N, N', N', -tetramethyl-1,3-butanediamine, N, N', N', -tetramethyl-1,4-butane diamine (TMBD), N, N, N', N', -tetramethyl-1,3-propanediamine, N, N, N', N', -tetramethyl-1, 6-hexanediamine (TMHD), 1,1,3,3, -tetramethylguanidine (TMGU), N, N, N', N', -pentamethyl-diethylenetriamine and a mixture thereof.

The strong acid may be manufactured by further adding one kind or two kinds or more a polar solvent to the polyfunctional amine aqueous solution in addition to the tertiary polyamine salt. The polar solvent may include an ethylene glycol derivative, a propylene glycol derivative, a 1,3-propanediol derivative, a sulfoxide derivative, a sulfone derivative, a nitrile derivative, a ketone derivative, a urea derivative, and a mixture thereof. The derivatives may also increase the flux in the generated membrane.

Examples of the glycol derivative include 2-methoxyethanol, 2-ethoxyethanol, 2-propoxyethanol, 2-butoxyethanol, di(ethylene glycol)-t-butyl-methyl ether, di(ethylene glycol) hexyl ether, (2-methoxy ethyl) ether, (2-ethoxyethyl) ether, and the like, and examples of the 1, 3-propanediol may include 1,3-heptanediol, 2-ethyl-1,1-hexanediol, 1,3-hexanediol, 1,3, pentanediol, and the like.

Dimethyl sulfoxide, tetramethylene sulfoxide, butyl sulfoxide, and the like may be usefully used as the sulfoxide derivative, and dimethyl sulfone, tetramethylene sulfone, butyl sulfone, methylphenyl sulfoxide, and the like may be usefully used as the sulfone derivative.

Preferably, the nitrile derivative may be used by selecting from the group consisting of acetonitrile, acrylonitrile, and propionitrile. The urea derivative may include 1,3-dimethyl-2-imidazolidinon, and the ketone derivative may include acetone, 2-butanone, 2-hexanone, 3-hexanone, 3-pentanone, cyclohexanone, cyclopentanone, and the like.

The total content of the aqueous solution in which the polar solvent alone or two kinds of polar solvents are mixed may range from 0.01 wt % to 1 wt %, more preferably, 0.05 wt % to 0.5 wt %.

When the polyamide-based active layer according to a preferable embodiment of the present invention is formed, the polyfunctional amine-containing aqueous solution may be applied on the porous support body for a time of 1 minute to 12 hours, or the porous support body may be immersed in the polyfunctional amine-containing aqueous solution. Here, if applied for the 1 minute or less, the amine aqueous solution may not be sufficiently coupled to the support body, non-uniform interracial polymerization may occur. On the other hand, if applied for a time exceeding the 12 hours, the amine aqueous solution may react in air and thus be significantly reduced in physical property.

Also, when the polyamide layer according to the present invention is formed, a material reacting with the polyfunctional amine to be used may include a polyfunctional acid halide, i.e., a polyfunctional acyl halide, a polyfunctional sulfonyl halide, a polyfunctional isocyanate, and the like. Preferably, the material reacting with the polyfunctional amine may include trimesoyl chloride, isophthaloyl chloride, terephthaloyl chloride, 1,3,5-cyclohexane-tricarbonyl chloride, or 1,2,3,4-tetramethyl-cyclohexane-carbonyl chloride alone or a mixture thereof. Here, the mixture may be most preferable in aspects of a salt rejection ratio. The polyfunctional acid halide may be generally used by being dissolved with 0.005 wt % to 5 wt % (more preferably, 0.01 wt % to 0.5 wt %) of an organic solvent that is not mixed with water. The organic solvent may not have to response to the interracial polymerization reaction, not have to be chemically bonded to acyl halide, and not have to damage the support body. Preferably, the organic solvent may be used by mixing n-alkane having 5 to 12 carbon atoms with constitutional isomer of saturated or unsaturated hydrocarbon having 8 carbon atoms or by using cyclic hydrocarbon having 5 to 7 carbon atoms. Alternatively, halogenated hydrocarbon such as Freon class may be used as the organic solvent.

Thus, in a preferable embodiment of the present invention, the fouling resistance and the chemical resistance may be secured. The fouled membrane may act as a factor by which the performance of the forward osmosis membrane assembly is reduced. Thus, the osmotic pressure gradient may be reduced, and the reduction of the filtration flux through the membrane may occur by the fouled membrane. However, according to the present invention, the reduction of the filtration flux in the related art may be minimized due to the fouling resistance.

In addition, the single-layered structure according to the related art may remove monovalent ion salt, but the salt rejection ratio may be significantly reduced, and the flux may be lowered. Also, an available pH range may be narrow. However, if the polyamide-based active layer is provided, the monovalent ions may be contained to achieve a high salt rejection ratio and a high flux.

In the forward osmosis membrane 100 according to a preferred embodiment of the present invention, when a 2M NaCl aqueous solution is used as a draw solution, and distilled water is used as feed water, the flux may be above 13 gfd, and the backward diffusion of the salt may be below 0.09 (($\mu$s/cm)/cm$^2$·min), more preferably, the flux may above 15.5 gfd, and the backward diffusion of the salt may be below 0.09 (($\mu$s/cm)/cm$^2$·min). Thus, in the forward osmosis membrane 100 according to a preferred embodiment of the present invention, since the flux is above 13 gfd, the water permeability may be high, and the backward diffusion of the salt may be below 0.09 (($\mu$s/cm)/cm$^2$·min). Thus, the salt rejection ratio may be high.

Preferably, each of the first separation membrane 11 and the second separation membrane 12 may have a thickness of 40 μm to 150 μm. If each of the first separation membrane 11 and the second separation membrane 12 has a thickness less than that of 40 μm, each of the membranes may be weak in strength. On the other hand, if each of the first separation membrane 11 and the second separation membrane 12 has a thickness greater than that of 150 μm, the flux may be reduced.

The first separation membrane 11 and the second separation membrane 12 may have the same thickness or thicknesses different from each other.

Next, the spacers 51, 52, and 53 disposed between the first separation membrane 11 and the second separation membrane 12 will be described.

According to the present invention, the plurality of spacers 51, 52, and 53 may be provided. Thus, the formation of the channel within the separation membranes having the envelope shape defined by the first separation membrane 11 and the second separation membrane 12 may be significantly improved.

According to the related art, since the single spacer is provided, the channel within the separation membranes may not be smoothly formed, and thus, the introduction of the solution into the separation members may not increase. However, according to the present invention, since the plurality of spacers 51, 52, and 53 are provided, the formation of the channel within the separation membranes may be improved, and the number of channels may increase to improve the introduction of the solution into the separation membranes, and simultaneously, the uniform filtration flux may be generated along the channels. Also, the turbulence may be promoted along the channels to improve the flux on the surface of the separation membranes and realize the more smooth osmotic action, thereby obtaining high-flux fresh water.

However, for the sole reason in which the spacer is provided in plurality within the forward osmosis membrane without defining its limitation, the flux may not be necessarily increased through the desired superior osmotic pressure gradient. Also, since the total thickness of the spacers, which is designed in consideration of the number of spacers and the thickness of each of the spacers, have an influence on the area of the forward osmosis separation membrane, which is capable of generating the osmotic pressure gradient, of the limited forward osmosis module, if the space has a thickness exceeding a predetermined thickness, the area of the forward osmosis separation membrane may be reduced to reduce an area, on which the osmotic pressure gradient is generated, thereby causing the reduction of the achieved flux.

Thus, the inventors of the present invention provides the spacer that satisfies the condition (1):

$$18 \leq \sum_{i=1}^{i} d_i \leq 80,$$

where the j represents the number j of total spacers, the d represents a thickness (milli inch) of each of the spacers, to solve the above-described problems.

Thus, the introduction of the seawater into the forward osmosis membrane assembly may be significantly improved to offset the reduced active area in the single forward osmosis membrane assembly, thereby realizing the smooth osmotic pressure gradient. Also, the number of forward osmosis membrane assembly provided in an external case (see reference numeral 30 of FIG. 4) that is limited to achieve the maximum flux and the active area of the separation membrane provided in the forward osmosis membrane assembly may be maximized. Furthermore, the defects due to the separation of the separation membranes of the forward osmosis membrane assembly and the reduction of the flux to be achieved due to the reduction of the area on which the osmotic pressure gradient is generated may be solved.

In the spacers, the formation of the fluid flow route, the increases of the flux through the osmotic pressure gradient, and the effects affecting the osmotic action according to the easiness of the winding process and the wound shape when manufactured as the forward osmosis module may be individually realized. Thus, preferably, the spacers may include at least one of a tricot filtering channel and a mesh sheet.

First, tricot filtering channels 51 and 53 will be described.

The tricot filtering channels may be provided in the forward osmosis membrane to form the channel and to perform an additional salt rejection function. In general, any tricot that is capable of being used as the spacer provided in the forward osmosis membrane may be used in the current embodiment. Preferably, at least one resin selected from the group consisting of polypropylene, polyethylene, poly-4-methylpentene, a crystalline copolymer of propylene-α-olefin, polyethylene terephthalate, polybutylene terephthalate, polyamide, and polycarbonate or low melting polyethylene terephthalate (LMP) that is modified by copolymerizing nylon, polypropylene with a polyethylene terephthalate resin. However, the present invention is not limited to the above-described material.

Next, the mesh sheet 52 will be described.

The mesh sheet 52 is provided in the forward osmosis separation membrane to form a channel. In general, any mesh sheet may be used if the mesh sheet is capable of being used as the spacer provided in the forward osmosis membrane. Preferably, the mesh sheet 52 may be formed of polypropylene or polyester. However, the present invention is not limited to the above-described material.

Preferably, the mesh sheet 52 may be a mesh sheet having porosity of 0.3% to 0.6% so as to smoothly form the channel. If the porosity is less than 0.3%, the fluid may not smoothly flow, and thus, the formation of the channel may be difficult to interrupt the osmosis phenomenon. If the porosity exceeds 0.6%, the mechanical strange may be reduced.

The spacers 51, 52, and 53 according to a preferred embodiment of the present invention may satisfy all the following conditions (2) to (5):

$$2 \leq a+b \leq 8, \quad (2)$$

where, a≥0, b≥0

When the tricot filtering channel is provided, $$5 \leq x \leq 20, \quad (3)$$

When the mesh sheet is provided, $$24 \leq y \leq 50 \quad (4)$$

$$40 \leq p+q \leq 80 \quad (5)$$

Where, the a represents the number of tricot filtering channels, the b represents the number of mesh sheets, the x represents a thickness (milli inch) of the single tricot filtering channel, the y represents a thickness (milli inch) of the single mesh sheet, the p represents the sum of the total thicknesses of the tricot filtering channels, and the q represents the total thickness of the mesh sheets.

According to a preferred embodiment of the present invention, all the conditions (2) to (5) may be satisfied. According to another preferred embodiment of the present invention, the mesh sheet may not be provided, and thus, the condition (4) may not be applied. Also, according to further another preferred embodiment of the present invention, the tricot filtering channel may not be provided, and thus, the condition (3) may not be applied.

Since the conditions (2) to (5) are satisfied, the introduction of the seawater into the forward osmosis membrane may be improved to maximize the osmotic pressure gradient and prevent the defects due to the separation of the separation membranes of the forward osmosis membrane assembly and the reduction of the osmotic pressure gradient.

First, in a preferred embodiment of the present invention, the condition (2): $2 \leq a+b \leq 8$, where, $a \geq 0$, $b \geq 0$ may be satisfied. The a represents the number of tricot filtering channels of the plurality of spacers, the b represents the number of mesh sheets of the plurality of spacers.

The number of spacers according to a preferred embodiment of the present invention may satisfy the above-described number in consideration of a thickness of the single tricot filtering channel that will be described below and a thickness of the single mesh sheet. If the condition is not satisfied, the total thickness of the spacers may be thick to reduce the area of each of the first and second separation membranes provided in the forward osmosis module. Thus, the area on which the osmotic pressure gradient is generated may be reduced to reduce the flux to be achieved.

Next, in a preferred embodiment of the present invention, when the tricot filtering channel that satisfies the condition (3) is provided, the forward osmosis membrane assembly may satisfy the following equation: $5 \leq x \leq 20$ The condition (3) may be applied only when the tricot filtering channel is provided. Here, the x represents a thickness (milli inch) of the tricot filtering channel that is provided as the spacer. If the tricot filtering channels 51 and 53 have the total thickness less than 5 milli inches, the sufficient strength may not be maintained, and also, the channels may not be smoothly formed. When the tricot filtering channels 51 and 53 have the total thickness greater than 20 milli inches, the number of spacer provided in the forward osmosis membrane assembly may be reduced, and the separation membrane is reduced in length to reduce the active area of the membrane, thereby reducing the flux.

When the tricot filtering channel is provided in plurality, the tricot filtering channels may have the same thickness or thicknesses different from each other.

Next, in a preferred embodiment of the present invention, when the mesh sheet that satisfies the condition (4) is provided, the forward osmosis membrane assembly may satisfy the following equation: $24 \leq y \leq 50$ The condition (4) may be applied only when the mesh sheet is provided. Here, the y represents a thickness (milli inch) of the mesh sheet that is provided as the spacer. Preferably, the mesh sheet may have a thickness of 28 milli inches to 46 milli inches. If the mesh sheet has a thickness less than 24 milli inches, the introduction and flow of the draw solution may be interrupted, and the osmosis phenomenon may not smoothly occur to reduce the flux to be achieved. When the mesh sheet has a thickness exceeding 50 milli inches, the number of spacer provided in the forward osmosis membrane assembly may be reduced, and the separation membrane is reduced in length to reduce the active area of the membrane, thereby reducing the flux. Also, there may be problems that occur when the module is processed.

Next, in a preferred embodiment of the present invention, the forward osmosis membrane assembly may satisfy the condition (5): $40 \leq p+q \leq 80$ The p represents the sum of the thicknesses of all the tricot filtering channels, and the q represents the sum of the thicknesses of all the mesh sheets.

Since the condition is satisfied, the flux may be increased through the improvement of the channel, and the reduction of the active area of the separation membrane in which the osmotic action occurs may be minimized. Also, the durability of the forward osmosis membrane assembly may be maintained. In order to improve the channel, if the spacers having the thickness exceeding the above-described range is provided, the active area of the separation membrane in the forward osmosis membrane assembly, which is provided in the forward osmosis module that will be described below may be reduced, and thus, the fresh water obtained through the forward osmosis may be reduced.

Figure 4:
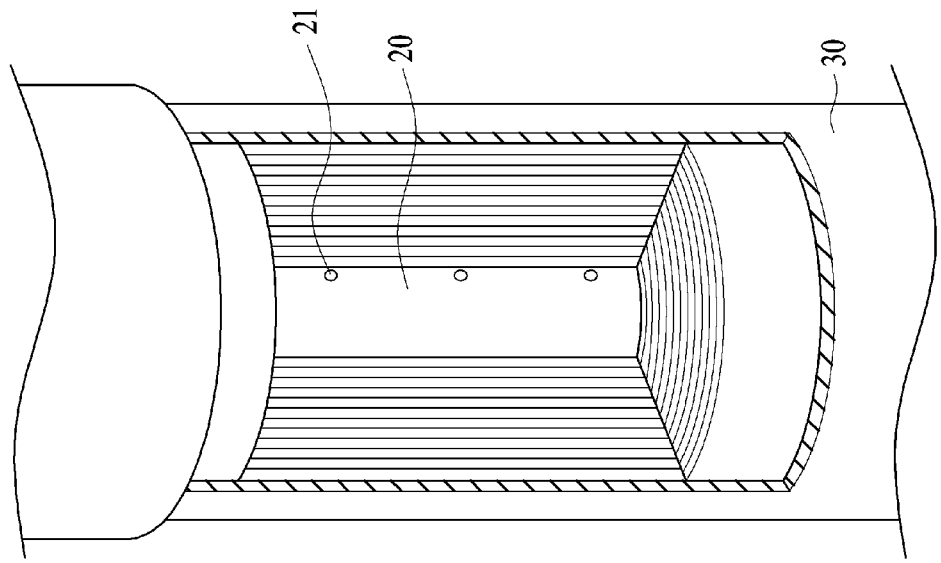
FIG. 4 is an exploded perspective view of a case in which the forward osmosis membrane assembly is spirally wound according to a preferred embodiment of the present invention.

Particularly, FIG. 4 is an exploded perspective view of the external case in which the forward osmosis membrane assembly is spirally wound according to a preferred embodiment of the present invention. The forward osmosis membrane assembly may be spirally wound around the porous water-permeable discharge tube 20 within the external case 30. As described above, a reason in which the active area of the separation membrane is reduced may be because in which an amount of separation membrane provided in an inner space of the external case 30 is limited by a limited space of the external case 30 in which the forward osmosis module is provided. Thus, if the spacer having a thickness exceeding the above-described range is provided, the amount of separation membrane may be relatively reduced to reduce the active area of the separation membrane that occurs the osmotic pressure gradient.

The active area of the separation membrane may be determined in consideration of a diameter of the porous water-permeable discharge tube 20 provided in the forward osmosis module, a length (i.e. a length of a surface b FIG. 2) of the forward osmosis membrane assembly in a direction in which the solution is introduced from the porous water-permeable discharge tube 20 to the forward osmosis membrane assembly, and the number of forward osmosis membrane assemblies provided in the external case 30. Although the introduction of the solution into the forward osmosis membrane assembly is increased just, and the surface area of the separation membrane is expanded just, it may be difficult to obtain the maximum flux through the formation of the maximum osmotic pressure gradient. For example, if the spacer has a thickness exceeding 80 milli inches, and the forward osmosis membrane assembly has a long length (i.e., the length of the surface b of FIG. 2) of the forward osmosis membrane assembly, the channel within the forward osmosis membrane assembly may be improved, and also, the surface area of the single forward osmosis membrane assembly may be increased. However, the number of forward osmosis membrane assembly provided in the limited inner space of the external case may be reduced, and thus, the surface area of the separation membrane provided in the external case may be reduced.

Also, if the forward osmosis membrane assembly has a long length (i.e., the length of the surface b of FIG. 2), a channel through which the solution introduced from the porous water-permeable discharge tube 20 to the forward osmosis membrane assembly flows may be increased in length to reduce the osmotic action.

Furthermore, if the spacers having the total thickness exceeding 80 milli inches are provided, the first separation membrane and the second separation membrane, which adhere to each other to surround the spacers, may be separated from each other to cause defects of the forward osmosis membrane assembly. Also, the solution flowing inside the separation membrane and the solution flowing inside the external case and having a concentration different from that of the solution flowing inside the separation membrane may be fluidically isolated from each other by using the separation membrane as a boundary to reduce the formation of the osmotic pressure gradient.

Furthermore, according to another preferred embodiment of the present invention, the spacers provided in the forward osmosis membrane assembly may have the total thickness equal to or greater than 40 milli inches to more increase the introduction of the solution into the forward osmosis membrane assembly and thus achieve the improved flux.

As described above, the spacers 51, 52, and 53 according to a preferred embodiment of the present invention may satisfy all the conditions (2) to (5) to significantly improve the introduction of seawater into the forward osmosis membrane assembly, thereby maximizing the osmotic pressure gradient. Thus, the flux to be achieved may be increased to prevent the defects of the forward osmosis membrane assembly due to the separation of the separation membranes of the forward osmosis membrane assembly, leakage of the solution flowing inside the forward osmosis membrane assembly, and the reduction of the osmotic pressure gradient.

More preferably, in another preferred embodiment of the present invention, provided is a spacer that further satisfies the condition (6): $60 \leq p+q \leq 80$ Thus, the flux of the seawater introduced into the forward osmosis membrane assembly may be further improved, and thus, the flux to be achieved therethrough may be further improved. As a result, the active area of the separation membrane for the osmotic action may be maximized in consideration of a case in which the forward osmosis membrane assembly is provided in the forward osmosis module that will be described below. Also, the increase of the active area of the separation membrane may improve the osmotic pressure gradient to maximize the obtainment of the fresh water.

According to a preferred embodiment of the present invention, at least one tricot filtering channel may be provided.

The formation of the channel within the forward osmosis membrane assembly may concern with the total thickness of the provided spacers. If only the mesh sheet is provided, the flux of the single forward osmosis membrane assembly may be improved when compared to a case in which the tricot filtering channel having a thickness similar to the total thickness of the spacers is provided.

However, the mesh sheet may have relatively high elasticity than the tricot filtering channel. Thus, in case of the forward osmosis membrane assembly including only the mesh sheet, it may be difficult to maintain uniform mechanical strength when compared to a case in which the forward osmosis membrane assembly includes only the tricot filtering channel. As described above, the high elasticity of the mesh sheet may affect force applied when the forward osmosis membrane assembly is wound around the porous water-permeable discharge tube provided in the forward osmosis membrane assembly, and thus, the forward osmosis membrane assembly may not be well wound. For example, if it is assumed that the forward osmosis membrane assembly is wound around the porous water-permeable discharge tube while pulling the surface b of the porous water-permeable discharge tube by using a worker's hand, when uniform force is not applied to the entire surface b, the forward osmosis membrane assembly may be wound to be twisted with respect to the porous water-permeable discharge tube or may wound without being closely attached to each other due to the elasticity of the mesh sheet.

The above-described problems may affect the osmotic action, and thus, the achievement of the flux may be difficult. Also, in the process of manufacturing the forward osmosis module, the workability for winding the forward osmosis membrane assembly may be deteriorated.

Thus, to solve the above-described problems, according to a preferred embodiment of the present invention, at least one tricot filtering channel may be provided to maintain the uniform mechanical strength of the forward osmosis membrane assembly, improve the winding workability, and realize the smooth osmotic pressure gradient because the forward osmosis membrane assembly is smoothly wound in a state in which the surfaces of the separation membranes are closely attached to each other.

According to another preferred embodiment of the present invention, two tricot filtering channels, each of which has thickness of 9 milli inches and one mesh sheet having a thickness of 46 milli inches, which are provided as the plurality of spacers may be provided. Thus, the osmotic pressure gradient may be maximized without separating the forward osmosis separation membranes from each other to achieve the improved flux.

According to another preferred embodiment of the present invention, a plurality of forward osmosis membrane assemblies which are spirally wound may be provided.

Particularly, FIG. 4 is an exploded perspective view of a pressure case in which the forward osmosis membrane assembly is spirally wound according to a preferred embodiment of the present invention. In the forward osmosis module according to a preferred embodiment of the present invention, the plurality of forward osmosis membrane assemblies may be spirally wound around the porous water-permeable discharge tube 20 and then be disposed in the external case 30.

The external case 30 may have a size and shape to accommodate the forward osmosis module disposed therein. Preferably, since the plurality of forward osmosis membrane assemblies are spirally wound, the external case 30 may have a cylindrical shape. However, the present invention is not limited to the above-described shape The external case 30 is not limited to a material thereof if the material is capable of being used for the general forward osmosis.

Figure 5:
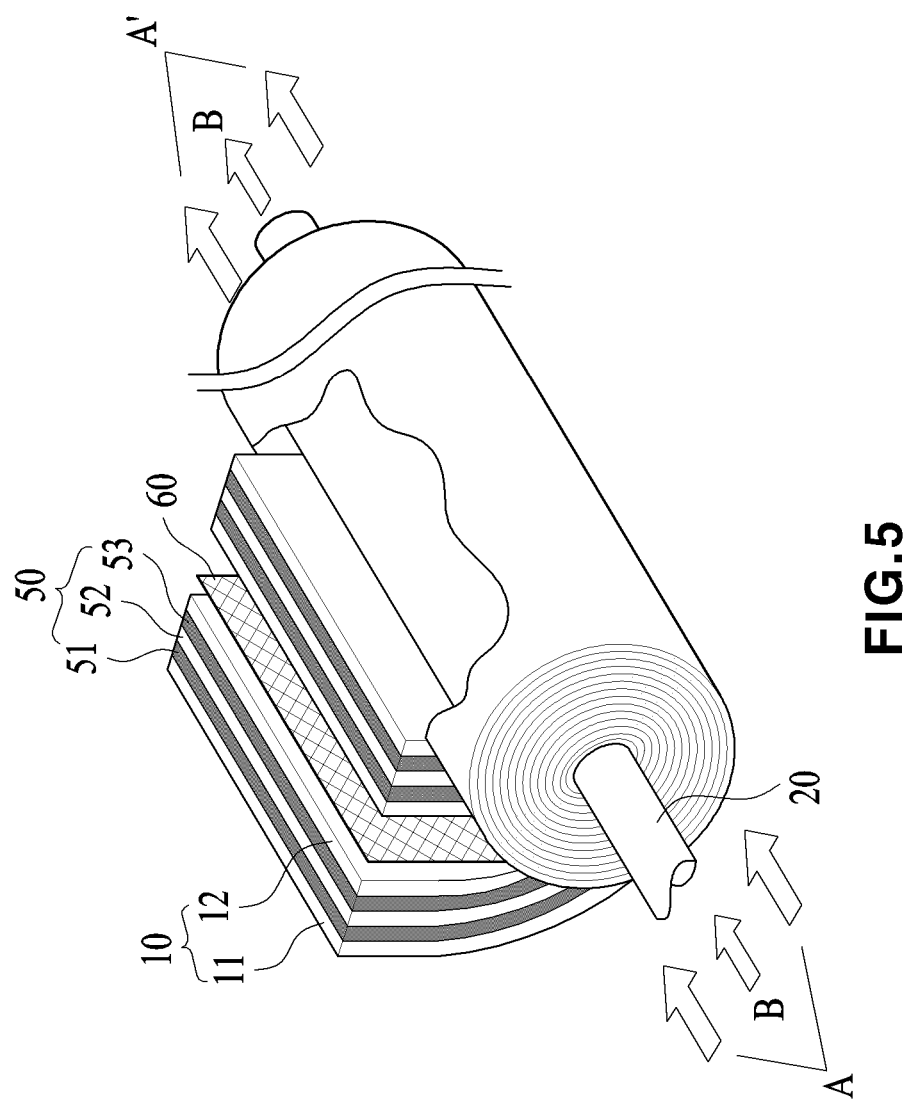
FIG. 5 is an exploded perspective view of a forward osmosis module according to a preferred embodiment of the present invention.

FIG. 5 is an exploded perspective view of the forward osmosis membrane assembly according to a preferred embodiment of the present invention. Here, a plurality of forward osmosis membrane assemblies 50 are spirally wound around a porous water-permeable discharge tube 20.

The porous water-permeable discharge tube 20 includes a plurality of holes 21. A partition wall (not shown) may be provided in the discharge tube 20. Thus, a fluid flowing through the porous water-permeable discharge tube 20 may be well introduced into separation membranes 11 and 12 of the forward osmosis membrane assemblies 50 through the holes 21. Particularly, in FIG. 5, a solution A of two solutions A and B having concentrations different from each other may flow inside the external case 30 and outside separation membranes 11 and 12 of the forward osmosis membrane assemblies 50, and the solution B may flow into the separation membranes 11 and 12 of the forward osmosis membrane assemblies 50 through the holes 21 from the porous water-permeable discharge tube 20. Thus, the two solutions A and B having the concentrations different from each other may be provided inside and outside the separation membranes 11 and 12 of the forward osmosis membrane assemblies 50 to generate osmotic pressure gradient.

Although the two solutions A and B are injected in the same directions as illustrated in FIG. 5, this may be merely an embodiment. Alternatively, in some cases, the two solutions A and B may be injected in directions different from each other.

The porous water-permeable discharge tube 20 may be used without being limited if the porous water-permeable discharge tube 20 is used in the general forward osmosis membrane. Preferably, the porous water-permeable discharge tube 20 may have a diameter of 4 inches to 8 inches and a length of 30 inches to 50 inches. However, the present invention is not limited thereto. For example, the porous water-permeable discharge tube 20 may vary in diameter and length according to the object of the present invention.

The forward osmosis membrane assemblies 50 include separation membranes 11 and 12 and spacers 51, 52, and 53. Since descriptions with respect to the separation membranes 11 and 12 and the spacers 51, 52, and 53 are the same as those of the above-described separation membranes and the spacers, their detailed descriptions will be omitted.

The forward osmosis membrane assemblies 50 may be spirally wound in a spiral wound type around the porous water-permeable discharge tube 20 to increase a surface area of the separation membrane of each of the forward osmosis membrane assemblies 50 per unit volume of the external case 30. Thus, an active area on which the osmotic action occurs may be increased to well generate the osmotic pressure gradient.

Figure 6:
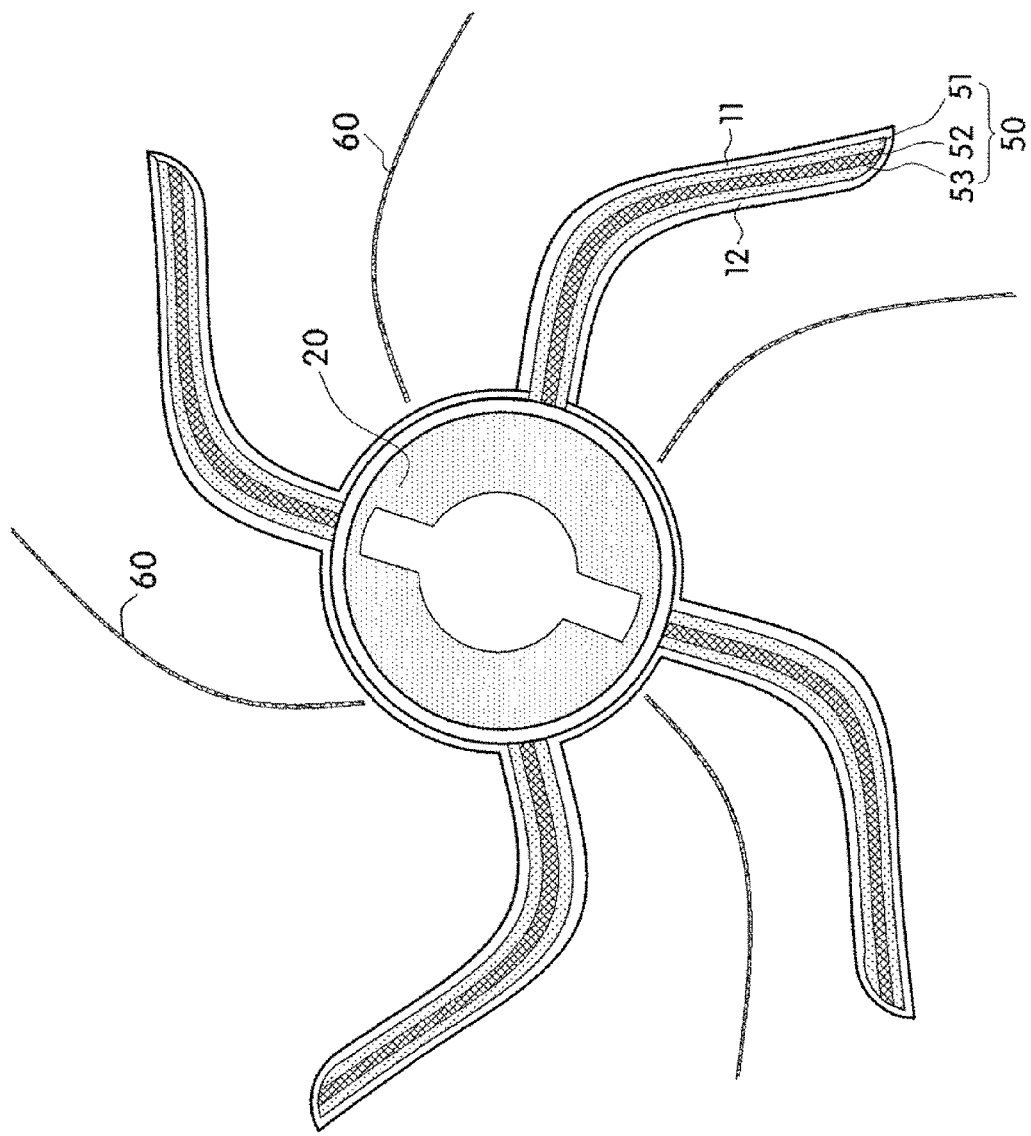
FIG. 6 is a cross-sectional view of the forward osmosis module according to a preferred embodiment of the present invention.

Preferably, a mesh sheet 60 may be provided between the plurality of forward osmosis membrane assemblies 50. The mesh sheet may form a channel through which a fluid flowing between the forward osmosis membrane assemblies 50 different from each other, for example, a channel through which the solution A of FIG. 5 smoothly flows. Particularly, FIG. 6 is a cross-sectional perspective view of the forward osmosis module according to a preferred embodiment of the present invention. The mesh sheet 60 may be provided between the forward osmosis membrane assemblies 50.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Embodiments Of The Invention

Although the present invention is specifically described through following Embodiments, the present invention is not limited to the following Embodiments, and also Embodiments are described to provide more general understandings of the present invention.

<Embodiment>

1. Manufacture of Forward Osmosis Membrane Assembly

A non-woven fabric having a thickness of 50 μm as a support body, a polymer support layer having a thickness of 100 μm, and forward osmosis membranes having the total thickness of 150 μm and including a polyamide-based active layer as first and second separation membranes were provided between the first and second separation membranes. Then, the number and thickness of spacers were changed under conditions of Tables 1 and 2 below to allow edges of the first and second separation membranes except for a surface through which a solution is injected from a porous water-permeable discharge tube to adhere to each other by using an adhesive, thereby manufacture a forward osmosis membrane assembly. Here, the spacers provided between the first and second separation membranes were stacked in a numerical order of the spacers in Tables 1 and 2.

2. Manufacture of Forward Osmosis Module

The manufactured forward osmosis membrane assembly was wound by the numbers in Tables 1 and 2 around the porous water-permeable discharge tube to manufacture a forward osmosis module.

COMPARATIVE EXAMPLE

Although manufactured through the same method, the number and thickness of spacers were changed under the conditions of Table 2 below to manufacture a forward osmosis membrane assembly and a forward osmosis module.

EXPERIMENTAL EXAMPLE 1

Whether the forward osmosis membrane assemblies manufactured in Embodiment and Comparative Example satisfy following conditions (1) to (6) was evaluated. If being satisfied, reference symbol O was expressed in Tables 1 and 2, and if not being satisfied, reference symbol X was expressed in Tables 1 and 2. Also, if the conditions (1) to (6) are not applied and thus not evaluated, reference symbol – was expressed in Tables 1 and 2.

(Conditions 1 to 6)

$$18 \leq \sum_{i=1}^{i} d_i \leq 80 \tag{1}$$

Where, i represents an individual spacer, j represents total number j of the spacers, and d represents a thickness (milli inch) of the individual spacer.

$$2 \leq a+b \leq 8, \tag{2}$$

where, a≥0, b≥0

When a tricot filtering channel is provided, $$5 \leq x \leq 20 \tag{3}$$

When a mesh sheet is provided, $$24 \leq y \leq 50 \tag{4}$$

$$40 \leq p+q \leq 80 \tag{5}$$

$$60 \leq p+q \leq 80 \tag{6}$$

Where, the a represents the number of tricot filtering channels, the b represents the number of mesh sheets, the x represents a thickness (milli inch) of the single tricot filtering channel, the y represents a thickness (milli inch) of the single mesh sheet, the p represents the sum of the total thicknesses of the tricot filtering channels, and the q represents the total thickness of the mesh sheets.

EXPERIMENTAL EXAMPLE 2

A osmotic pressure gradient was formed so that a draw solution flows into the porous water-permeable discharge tube of each of the osmosis membrane modules manufactured according to Embodiment and Comparative Example, and feed water is injected output the forward osmosis membrane assembly to allow the water to flow from a solution having a low salinity to a solution having a high salinity. Here, a time-variable weight of the feed water was measured to measure an amount of water per hour, thereby to express the resultant values in Tables 1 and 2.

Particularly, in Tables 1 and 2 below, it is seen that the flux is generally increased as the total thickness of the spacers is increased (Embodiments 6 and 8 and Comparative Example 4). Also, it is seen that the flux is increased as the number of spacers is increased under a state in which the spacers have the same thickness.

Also, in case of the same number of spacers and the similar total thickness of spacers in Embodiments 5 and 7, it is seen that the flux is relatively high when only the mesh sheets are provided as the spacers.

Furthermore, when compared to a case in which only the condition (5) according to the present invention is satisfied (Embodiments 5 and 7), it is seen that the flux is relatively high when the conditions (5) and (6) are satisfied.

However, when the same number of spacers are provided, it is seen through Embodiments 6 and 8 that the flux is not increased although the total thickness of the spacers is thick.

EXPERIMENTAL EXAMPLE 3

Only the draw solution flowed outside the forward osmosis membrane assembly of each of the forward osmosis membrane module manufactured according to Embodiment and Comparative Example, and then TDS of the filtered water was measured to calculate a salt rejection ratio by using the following equation, thereby to express the resultant values in Tables 1 and 2.

$$\text{Salt rejection ratio} = \left(\frac{TDS \text{ of filtered water}}{TDS \text{ of draw solution}}\right) \times 100$$

Particularly, in Tables 1 and 2 below, when compared to a case in which only the mesh sheets are provided as the spacers (Comparative Example 2), it is seen that the salt rejection ratio is relatively high when a tricot filtering channel is provided (Embodiment 5), and the salt rejection ratio is decreased when the total thickness of the spacers is thin (Embodiment 1 and Comparative Example 1) even though the tricot filtering channel is provided.

EXPERIMENTAL EXAMPLE 4

In order to measure an inlet pressure of the forward osmosis membrane assembly provided in each of the forward osmosis membranes manufactured according to Embodiment and Comparative Example, feed water flowing outside the forward osmosis membrane assembly was fixed to a pressure of 1.1 bar, and then, an inlet pressure of a draw solution that is introduced again into the porous water-permeable discharge tube from the forward osmosis membrane assembly was measured. The obtained values are expressed in Tables 1 and 2.

Particularly, in Tables 1 and 2 below, it means that resistance is low when the value of the measured inlet pressure low to allow the solution to be easily introduced and to allow the osmosis phenomenon to be more smoothly generated. Thus, it is seen that the value of the inlet pressure is decreased when the flux is increased.

EXPERIMENTAL EXAMPLE 5

In order to confirm whether the separation membranes normally adheres to each other in the forward osmosis membrane assembly in which Experimental Example 1 is performed, water was injected to check whether the water leaks to the outside. Here, when the water does not leak, reference symbol X was expressed in tables 1 and 2, and when the water leaks, reference symbols Δ and ○ were expressed according to a leaking degree of the water in Tables 1 and 2.

Particularly, in Tables 1 and 2 below, in case of Comparative Example 4 in which the total thickness of the spacers exceeds the conditions of the present invention, although a high flux is achieved, adhesion defect of the separation membranes may occur. Also, in the achieved flux, since the feed water may flow into the separation membranes due to the separation of the separation membranes, it may be difficult to determine that the increased flux is obtained.

EXPERIMENTAL EXAMPLE 6

In order to evaluate the easiness in winding of the forward osmosis membrane assembly, each of the forward osmosis membrane assemblies manufactured in Embodiment and Comparative Example was wound around the porous water-permeable discharge tube having a length of 40 inches and a diameter of 4 inches by using the method that is generally used when the forward osmosis module is manufactured. Here, a closely attached degree and a unsymmetrically wound degree between the forward osmosis membranes assemblies that are spirally wound were synthetically and relatively evaluated to express the obtained values in Tables 1 and 2 by using reference symbol ⊚ when normally wound and by using reference symbols ○, Δ, and X according to the wound degree when abnormally wound.

Particularly, in Tables 1 and 2 below, when only the mesh sheets are provided as the spacers (Embodiments 7 and 11 and Comparative Example 2), it is seen that the winding easiness is deteriorated due to elasticity of the material itself of the mesh sheets when compared to a case in which the mesh sheets and the tricot filtering channels are provided as the spacers.

TABLE 1

| T: Tricot M: Mesh Unit (milli inch) | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Spacer 1 | Kind/Thickness | T/9 | T/9 | T/16 | T/16 | T/16 | T/16 | M/28 | T/9 |
| Spacer 2 | Kind/Thickness | T/9 | T/9 | T/16 | T/16 | M/46 | M/46 | M/28 | M/46 |
| Spacer 3 | Kind/Thickness | — | T/9 | — | T/16 | — | T/16 | — | T/9 |
| Spacer 4 | Kind/Thickness | — | T/9 | — | — | — | — | — | — |

TABLE 1-continued

| T: Tricot<br>M: Mesh<br>Unit (milli inch) | | Embodiment 1 | Embodiment 2 | Embodiment 3 | Embodiment 4 | Embodiment 5 | Embodiment 6 | | Embodiment 7 | Embodiment 8 | |
|---|---|---|---|---|---|---|---|---|---|---|---|
| Spacer 5 | Kind/Thickness | — | T/9 | — | — | — | — | | — | — | |
| Spacer 6 | Kind/Thickness | — | T/9 | — | — | — | — | | — | — | |
| Spacer 7 | Kind/Thickness | — | T/9 | — | — | — | — | | — | — | |
| Spacer 8 | Kind/Thickness | — | T/9 | — | — | — | — | | — | — | |
| Spacer 9 | Kind/Thickness | — | — | — | — | — | — | | — | — | |
| Condition (1) | | ○ | ○ | ○ | ○ | ○ | ○ | | ○ | ○ | |
| Condition (2) | | ○ | ○ | ○ | ○ | ○ | ○ | | ○ | ○ | |
| Condition (3) | | ○ | ○ | ○ | ○ | ○ | ○ | | — | ○ | |
| Condition (4) | | — | — | — | — | ○ | ○ | | ○ | ○ | |
| Condition (5) | | X | ○ | X | ○ | ○ | ○ | | ○ | ○ | |
| Condition (6) | | X | ○ | X | X | ○ | ○ | | X | ○ | |
| Diameter (inch) of porous water-permeable discharge tube | | 4 | 4 | 4 | 4 | 4 | 4 | 8 | 4 | 4 | 8 |
| Number of forward osmosis membrane assembly | | 3 | 3 | 3 | 3 | 3 | 3 | 10 | 3 | 3 | 11 |
| Flux (gfd) | | 5.86 | 10.27 | 6.92 | 9.28 | 11.83 | 15.92 | 53.23 | 13.29 | 16.61 | 61.26 |
| Salt rejection ratio (%) | | 98 | 99 | 99 | 99 | 99 | 99 | 99 | 99 | 99 | 99 |
| Inlet pressure (bar) | | 0.86 | 0.40 | 0.84 | 0.78 | 0.57 | 0.24 | 0.22 | 0.53 | 0.27 | 0.25 |
| Adhesion defect of separation membrane | | X | X | X | X | X | X | X | X | X | X |
| Winding easiness | | ◎ | ○ | ◎ | ◎ | ○ | ◎ | ◎ | Δ | ◎ | ◎ |

TABLE 2

| T: Tricot<br>M: Mesh<br>Unit (milli inch) | | Embodiment 9 | Embodiment 10 | Embodiment 11 | Comparative Example 1 | Comparative Example 2 | Comparative Example 3 | Comparative Example 4 |
|---|---|---|---|---|---|---|---|---|
| Spacer 1 | Kind/Thickness | T/5 | T/3 | M/55 | T/16 | M/46 | T/5 | T/16 |
| Spacer 2 | Kind/Thickness | T/5 | T/3 | M/15 | — | — | T/5 | T/16 |
| Spacer 3 | Kind/Thickness | T/5 | T/3 | — | — | — | — | M/46 |
| Spacer 4 | Kind/Thickness | T/5 | T/3 | — | — | — | — | T/16 |
| Spacer 5 | Kind/Thickness | T/5 | T/3 | — | — | — | — | — |
| Spacer 6 | Kind/Thickness | T/5 | T/3 | — | — | — | — | — |
| Spacer 7 | Kind/Thickness | T/5 | — | — | — | — | — | — |
| Spacer 8 | Kind/Thickness | T/5 | — | — | — | — | — | — |
| Spacer 9 | Kind/Thickness | T/5 | — | — | — | — | — | — |
| Condition (1) | | ○ | ○ | ○ | X | X | X | X |
| Condition (2) | | X | ○ | ○ | X | X | ○ | ○ |
| Condition (3) | | ○ | X | — | ○ | — | ○ | ○ |
| Condition (4) | | — | — | X | X | ○ | — | ○ |
| Condition (5) | | ○ | X | ○ | X | ○ | X | X |
| Condition (6) | | X | X | ○ | X | X | X | X |
| Diameter (inch) of porous water-permeable discharge tube | | 4 | 4 | 4 | 4 | 4 | 4 | 4 |
| Number of forward osmosis membrane assembly | | 3 | 3 | 3 | 3 | 3 | 3 | 3 |
| Flux (gfd) | | 9.72 | 6.14 | 12.98 | 5.50 | 10.64 | 5.02 | 15.97 |
| Salt rejection ratio (%) | | 99 | 99 | 99 | 98 | 98 | 98 | 99 |

TABLE 2-continued

| T: Tricot M: Mesh Unit (milli inch) | Embodiment 9 | Embodiment 10 | Embodiment 11 | Comparative Example 1 | Comparative Example 2 | Comparative Example 3 | Comparative Example 4 |
|---|---|---|---|---|---|---|---|
| Inlet pressure (bar) | 0.42 | 0.63 | 0.52 | 0.91 | 0.79 | 0.89 | 0.17 |
| Adhesion defect of separation membrane | X | X | X | X | X | X | ○ |
| Winding easiness | ○ | ○ | Δ | ⊚ | Δ | ⊚ | ○ |

The invention claimed is:

1. A forward osmosis membrane assembly comprising:
a first separation membrane;
a second separation membrane; and
a plurality of spacers for defining channels between the first separation membrane and the second separation membrane,
wherein at least one of the first separation membrane and the second separation membrane comprises a forward osmosis membrane,
wherein the forward osmosis membrane comprises a support body, a polymer support layer disposed on the support body, and a polyamide-based active layer disposed on the polymer support layer,
wherein each of the first separation membrane and the second separation membrane has a thickness of 40 μm to 150 μm,
wherein the first separation membrane, the second separation membrane, and the spacers form an envelope, wherein one side of the envelope is open and the other three sides of the envelope are sealed, wherein the spacers comprise at least one tricot filtering channel and at least one mesh sheet, wherein the spacers satisfy the following conditions (1) to (4):

$$2 \leq a+b \leq 8, \quad (1)$$

wherein a>0 and b>0;

$$5 \leq x \leq 20; \quad (2)$$

$$24 \leq y \leq 50; \quad (3)$$

$$40 \leq p+q \leq 80; \quad (4)$$

wherein a represents the number of tricot filtering channels, h represents the number of mesh sheets, x represents a thickness (mill inch) of the single tricot filtering channel, y represents a thickness (mill inch) of a single mesh sheet, p represents the sum of a total thickness (mill inch) of the tricot filtering channels, and q represents a total thickness (mill inch) of the mesh sheets.

2. The forward osmosis membrane assembly of claim 1, wherein the support body comprises a non-woven fabric or woven fabric that is formed of a synthetic fiber selected from the group consisting of polyester, polypropylene, nylon, and polyethylene or a natural fiber including a cellulose-based pulp, wherein the mesh sheet is disposed between a separation membrane and the tricot filtering channel.

3. The forward osmosis membrane assembly of claim 1, wherein the polymer support layer comprises at least one selected from the group consisting of a polysulfone-based polymer, a polyamide-based polymer, a polyimide-based polymer, a polyester-based polymer, an olefin-based polymer, a polybenzimidazole polymer, polyvinylidene fluoride and polyacrylonitrile, wherein the mesh sheet is disposed between two tricot filtering channels.

4. The forward osmosis membrane assembly of claim 1, wherein, when a 2M NaCl aqueous solution is used as a draw solution, and distilled water is used as feed water having a pressure of 1.1 bar, the forward osmosis membrane has a flux greater than 13 gfd and backward diffusion of salts; which is less than 0.09 (μs/cm)/cm²·min.

5. The forward osmosis membrane assembly of claim 1, wherein the spacer further satisfies a following condition (5);

$$60 \leq p+q \leq 80 \quad (5).$$

6. The forward osmosis membrane assembly of claim 1, wherein the spacers comprise two tricot filtering channels, each of which has a thickness of 9 milli inches and one mesh sheet having a thickness of 46 milli inches.

7. The forward osmosis membrane assembly of claim 6, wherein the mesh sheet of the spacers is disposed between the two tricot filtering channels.

8. A forward osmosis module comprising a plurality of forward osmosis membrane assemblies of claim 1, which are wound in a spiral wound shape.

* * * * *